(12) United States Patent
van der Beek

(10) Patent No.: US 8,526,280 B2
(45) Date of Patent: Sep. 3, 2013

(54) METHOD AND APPARATUS FOR MOUNTING A DISC

(75) Inventor: Brian van der Beek, Helmond (NL)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 13/397,219

(22) Filed: Feb. 15, 2012

(65) Prior Publication Data

US 2012/0213047 A1  Aug. 23, 2012

Related U.S. Application Data

(60) Provisional application No. 61/444,529, filed on Feb. 18, 2011.

(51) Int. Cl.
*G11B 15/04* (2006.01)

(52) U.S. Cl.
USPC ............................ 369/53.2; 369/53.41

(58) Field of Classification Search
None
See application file for complete search history.

(56) References Cited

U.S. PATENT DOCUMENTS

| | | | | |
|---|---|---|---|---|
| 7,286,461 | B2* | 10/2007 | Miyake et al. | 369/53.22 |
| 8,059,509 | B2* | 11/2011 | Bakx et al. | 369/53.2 |
| 2003/0231568 | A1 | 12/2003 | Ohhashi | |
| 2004/0196762 | A1* | 10/2004 | Osakabe | 369/47.53 |
| 2006/0256675 | A1* | 11/2006 | Nishino et al. | 369/47.1 |
| 2008/0059985 | A1* | 3/2008 | Tasaka | 720/718 |
| 2010/0329086 | A1* | 12/2010 | Takeda | 369/30.03 |

OTHER PUBLICATIONS

ECMA: Standardizing Information and Communication Systems: "Standard ECMA-267: 120 mm DVD—Read-Only Disk", Standard ECMA-267, No. 272, Apr. 1, 2001, pp. 1-86, XP002258094.
International Search Report and Written Opinion of International Searching Authority, mailed Jun. 6, 2012 in International Patent Application No. PCT/IB2012/000444.
ECMA International, Standard ECMA-337, Data Interchange on 120 mm and 80 mm Optical Disk using +RW Format—Capacity: 4,7 and 1,46 Gbytes per Side (Recording speed up to 4x), $2^{nd}$ Edition, Dec. 2003.
ECMA International, Standard ECMA-349, Data Interchange on 120 mm and 80 mm Optical Disk using +R Format—Capacity: 4,7 and 1,46 Gbytes per Side (Recording speed up to 8x), $2^{nd}$ Edition, Jun. 2004.

* cited by examiner

*Primary Examiner* — Paul Huber

(57) ABSTRACT

Aspects of the disclosure provide a method for mounting a storage disc. The method includes receiving data stored at a location on the storage disc. The location on the storage disc used for providing a structure of the storage disc as a result of a previous recording on the storage disc. Then, the method includes determining a medium type based on a parameter in the structure that is indicative of the medium type.

20 Claims, 2 Drawing Sheets

METHOD AND APPARATUS FOR MOUNTING A DISC

INCORPORATION BY REFERENCE

This present disclosure claims the benefit of U.S. Provisional Application No. 61/444,529, "Fast Mounting of a Written-DVD+R/+RW Disc" filed on Feb. 18, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a disc includes physical format information that defines the type of the disc. When a disc is inserted in a disc drive, the disc drive starts a mounting process to recognize the type of the disc and then prepares and sets up operations on the disc according to the type of the disc.

SUMMARY

Aspects of the disclosure provide a method for mounting a storage disc. The method includes receiving data stored at a location on the storage disc. The location on the storage disc is used for providing a structure of the storage disc as a result of a previous recording on the storage disc. Then, the method includes determining a medium type based on a parameter in the structure that is in indicative of the medium type.

In an embodiment, the method includes receiving a disc control block. Then, the method includes comparing a content descriptor in the disc control block with a plurality of pre-known content descriptors in association with medium types, and determining the medium type of the storage disc based on the comparison. In an example, the method includes determining the medium type to be DVD+R when the content descriptor in the disc control block is indicative of a session disc control block (SDCB). In another example, the method includes determining the medium type to be DVD+RW when the content descriptor in the disc control block is indicative at least one of a formatting disc control block (FDCB) and a write inhibit disc control block (WDCB).

According to an aspect of the disclosure, the method includes receiving data stored at another location on the storage disc. The other location on the storage disc is used for storing physical format information decoded from address in pre-groove (ADIP), and receiving the data stored at the first location when the data stored at the other location indicates the medium type is read only memory (ROM).

Aspects of the disclosure provide a disc drive. The disc drive includes a read and write unit configured to perform read and write operation on a storage disc, and a drive controller. The drive controller is configured to control the read and write unit to read data stored at a location on the storage disc that corresponds to a structure of the storage disc as a result of a previous recording, and to determine a medium type based on a parameter in the structure that is indicative of the medium type.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
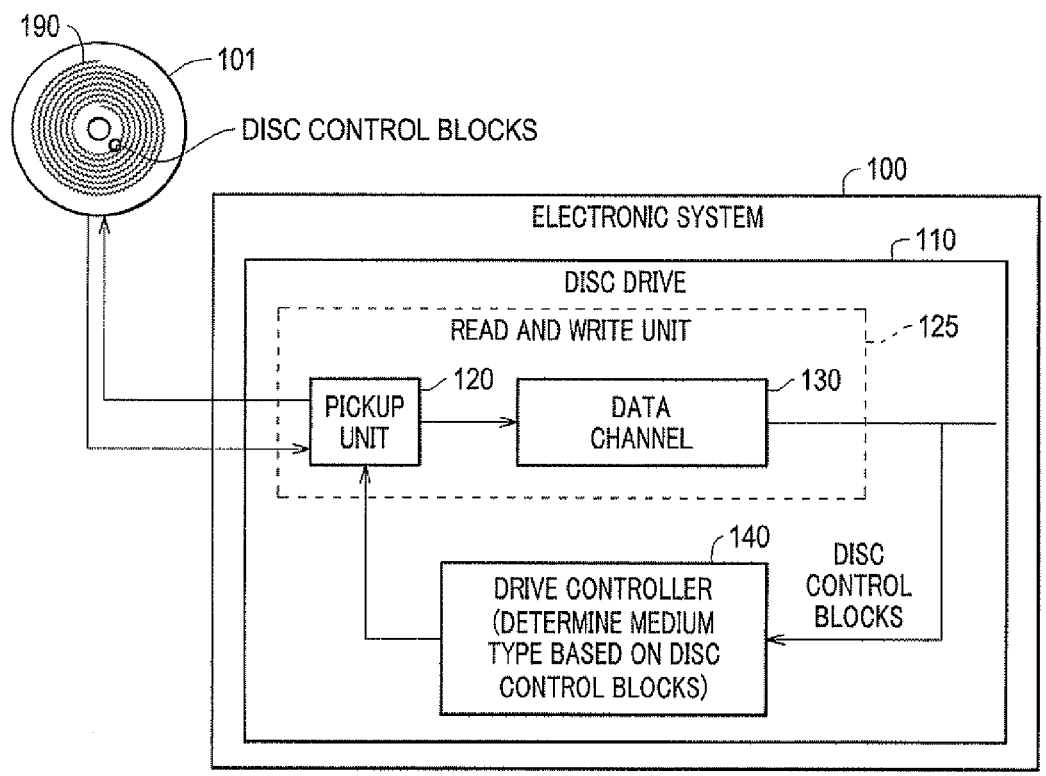
FIG. 1 shows a block diagram of an electronic system 100 according to an embodiment of the disclosure.

FIG. 1 shows a block diagram of an electronic system example 100 according to an embodiment of the disclosure. The electronic system 100 includes a disc drive 110 to receive a storage disc 101, and to operate, such as read and write, on the storage disc 101. The disc drive 110 is configured to determine a medium type, such as digital versatile disc (DVD) write once (DVD+R) disc, DVD rewritable (DVD+RW) disc, and the like, based on signature in the stored structure information on the storage disc 101. The structure information indicates recording structure of the storage disc 101 as a result of a previous recording on the storage disc 101. In an example, the structure information is stored in the form of a plurality of disc control blocks.

In an embodiment, the disc drive 110 includes a read and write unit 125 and a drive controller 140. The read and write unit 125 is configured to read data stored on the storage disc 101 and is configured to write data onto the storage disc 101. The drive controller 140 is configured to control the operations of the read and write unit 125. In an example, the drive controller 140 is configured to control the read and write unit 125 to read specific locations on the storage disc 101. In another example, the drive controller 140 is configured to determine various parameters of the storage disc 101, such as medium type, and the like, and control the read and write unit 125 to write onto the storage disc 101 based on the various parameters.

According to an embodiment of the disclosure, the read and write unit 125 includes a pick-up unit 120 and a data channel 130. In an example, the pick-up unit 120 is an optical pick-up unit that includes a laser beam unit (not shown) for providing energy to the storage disc 101 during read and write operations.

To record data onto the storage disc 101, in an example, the laser beam unit directs a laser beam to a location of the storage disc 101. The laser beam suitably heats the location and changes a property, such as reflectivity, and the like, at the location to record data at the location.

To read the stored data, in an example, a low power laser beam is driven to a location on the storage disc 101, the laser beam is reflected based on the reflectivity at the location. The pick up unit 120 includes an optical detector to detect the intensity of the reflected laser beam, and generates an electrical signal corresponding to the intensity. The data channel 130 processes the electrical signal to extract the data.

In an example, the storage disc 101 is an optical disc, such as compact disc (CD), digital versatile disc (DVD), Blu-ray disc, and the like, that stores a bit stream as optical property changes. Further, the storage disc 101 can be a recordable medium, such as DVD write once (DVD+R) disc, DVD rewritable (DVD+RW) disc, and the like.

According to an embodiment of the disclosure, recording on the storage disc 101 follows a medium standard. The medium standard specifies various aspects for the medium type of the storage disc 101 in order to enable parties to interchange data. The various aspects include generate aspects that are common to multiple medium types, and specific aspects that are applicable to the specific medium type. Thus, to record data on the storage disc 101, the disc drive 110 determines the medium type of the storage disc 101, and then records data onto the storage disc 101 according to the medium standard for the medium type.

In addition, in an embodiment, when the storage medium 101 is a recordable medium, a recording on the storage medium 101 changes a structure of the recordable medium. In an example, the structure is also recorded on the recordable medium to provide information and to assist a next recording on the recordable medium. The recorded structure includes signature that is specific to the recordable medium.

Generally, medium type information is encoded on the storage disc 101 during disc manufacture. In an embodiment, the medium type information is encoded in address in pre-groove (ADIP), and the disc drive 110 can extract the medium type information from the ADIP. For example, the storage disc 101 includes a spiral recording track 190 in the form of a spiral groove adjacent to a spiral land. On the spiral recording track 190, user data can be stored on a recording layer by forming either data pits or data marks. The data pits or data marks can be preferred to have a substantially constant linear length to improve the data storage capability of the storage disc 101. To assist recording data marks or data pits, timing and address information can be encoded in the spiral groove and the spiral land during disc manufacturing. In an example, the timing information can be encoded by wobbling the spiral groove and the spiral land. Further, the wobbles of the wobbled track is modulated, such as phase modulated, amplitude modulated, and the like to form ADIP to encode address and physical format information. The physical format information includes the medium type information.

According to an aspect of the disclosure, the pick-up unit 120 can generate a push-pull signal (not shown) corresponding to the wobbled recording track 190. In an example, the disc drive 110 includes a wobble channel (not shown) configured to process the push-pull signal to detect the information in the ADIP.

In an example, the disc drive 110 decodes the physical medium information from the ADIP in the wobbled track and determines the medium type. Then, the disc drive 110 operates on the storage disc 101 according to the determined medium type. According to an embodiment of the disclosure, the encoded information density using ADIP is relatively low compared to the data pits or data marks on the wobbled recording track 190, and it takes relatively long time, such as about one second, for the disc drive 110 to read the medium type information in the ADIP.

According to an aspect of the disclosure, when the storage disc 101 is a recordable medium, such as DVD+R disc, DVD+RW disc, and the like, the physical format information is recorded as data pits or data marks on the recording track 190 of the storage disc 101 during an initial recording operation on the storage disc 101. In an example, when the storage disc 101, which has not been written or recorded to before, is inserted in a disc drive, such as the disc drive 110, or any other suitable disc drive that can write on the storage disc 101, the disc drive decodes the physical format information from the ADIP, and writes the physical format information at a specific location, such as a control data zone on the recording track 190 of the storage disc 101 as data pits or data marks. Thus, when the storage disc 101 is subsequently inserted into a suitable disc drive, the disc drive starts a mounting process to read the data stored at the specific location, such as the control data zone, on the recording track to determine the medium type, and to prepare the disc drive and setup the disc drive according to the medium type. Thus, the disc drive does not need to decode the ADIP. Then, the mounting time for the storage disc 101 can be reduced.

Figure 2:
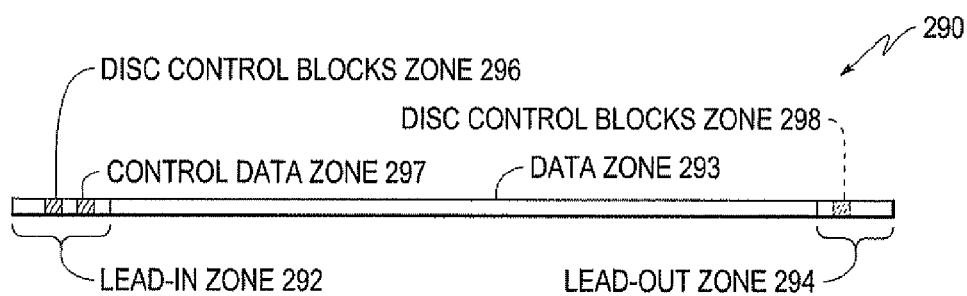
FIG. 2 shows a layout of a recording track 290 according to an embodiment of the disclosure.

FIG. 2 shows a layout of a recording track example 290 on a storage disc according to an embodiment of the disclosure. The recording track 190 of the storage disc 101 in FIG. 1 can have same or similar layout as the recoding track 290. The recording track 290 includes a plurality of zones, such as a lead-in zone 292, a data zone 293, a lead-out zone 294, and the like. Each zone includes physical sectors according to a suitable medium standard.

In a DVD+R example, the lead-in zone 292 includes physical sectors 02A480 to 02FFFF in hexadecimal, the data zone 293 includes physical sectors 030000 to 26053F in hexadecimal, and the lead-out zone 294 includes physical sectors 260540 to 26193F in hexadecimal.

In a DVD+RW example, the lead-in zone 292 includes physical sectors 01D830 to 02FFFF in hexadecimal, the data zone 293 includes physical sectors 030000 to 26053F in hexadecimal, and the lead-out zone 294 includes physical sectors 260540 to 26C08F in hexadecimal.

In the FIG. 2 example, the lead-in zone 292 includes disc control blocks zone 296 and a control data zone 297. The lead-out zone 293 also includes disc control blocks zone 298. The disc control blocks zones 296 and 298 include suitable disc control blocks that store recording structures of the storage disc according to suitable standard.

According to an embodiment of the disclosure, the control data zone 297 includes a medium type that is not the true medium type of storage disc. In an example, when a disc drive that performs a previous recording operation finalizes the storage disc, the disc drive records ROM medium type instead of the true medium type of the storage disc in the control data zone 297 to make the storage disc compatible to the ROM medium type.

According to an embodiment of the disclosure, information in the disc control blocks zones 296 and 298 can be specific to the medium type, and can be used to recognize the true medium type. According to an aspect of the disclosure, the disc control blocks zone 296 is written at the same location in the lead-in zone 292. Thus, in an example, information in the disc control blocks zone 296 is read and used to recognize the true medium type.

In the DVD+R example, the disc control blocks zone 296 includes 256 physical sectors (02EEC0 to 02EFBF). Each set of 16 physical sectors is a disc control block (DCB). In each DCB, the first four bytes are content descriptor. When the first four bytes are "000000" in hexadecimal, the DCB is unused; and when the first four bytes are "53444300" in hexadecimal, the DCB is a session DCB (SDCB).

In the DVD+RW example, the disc control blocks zone 296 also includes 256 physical sectors (02EECO to 02EFBF). Each set of 16 physical sectors is a disc control block (DCB). In each DCB, the first four bytes are content descriptor. When the first four bytes are "000000" in hexadecimal, the DCB is unused; when the first four bytes are "46444300" in hexadecimal, the DCB is a formatting DCB (FDCB); and when the first four bytes are "57444300" in hexadecimal, the DCB is a write inhibit DCB (WDCB).

According to an embodiment of the disclosure, the disc drive 110 is configured to determine the medium type of the storage disc 101 based on a signature in the stored structure of the storage disc 101, such as a signature in a disc control block of the storage disc 101. Specifically, during a previous recording operation on the storage disc 101, the structure of the storage disc 101 is changed, and the new structure is also recorded on the storage disc 101, for example in a disc control block, The recorded structure includes signature that is specific to the medium type of the storage disc 101.

In an example, when the storage disc 101 is a DVD+R disc, the structure of the storage disc 101 is stored in the format of a disc control block (DCB) in the lead-in zone and lead-out zone of the storage disc 101. The disc control block includes various information of the structure, such as a content descriptor, drive identification, a structure of an open session, location of all previous sessions, and the like, that are specific to DVD+R. In an example, when the content descriptor is "00000000" in hexadecimal, the disc control block is unused, and when the content descriptor is "53444300" in hexadecimal, the disc control block is session disc control block (SDCB). The SDCB is specific to DVD+R disc, and thus "53444300" in the content descriptor is a signature of DVD+R.

In another example, when the storage disc 101 is a DVD+RW disc, the structure of the storage disc 101 is also stored in the format of a disc control block in the lead-in zone and lead-out zone of the storage disc 101. Similar to above, the disc control block includes various information of the structure, such as a content descriptor, drive identification, last written address, bitmap start address, and the like, that can be specific to DVD+RW. In an example, when the content descriptor is "00000000" in hexadecimal, the disc control block is unused; when the content descriptor is "46444300" in hexadecimal, the disc control block is formatting disc control block (FDCB); and when the content descriptor is "57444300" in hexadecimal, the disc control block is write inhibit disc control block (WDCB). The FDCB and WDCB are specific to DVD+RW disc, and thus "46444300" or "57444300" in the content descriptor is a signature of DVD+RW.

During operation, in an example, when the storage disc 101 is inserted in the disc drive 110, the disc drive 110 starts a mounting process to determine the medium type of the storage disc 101 based on the DCB recorded on the storage disc 101 during previous recordings, and to prepare and setup operation on the storage disc 101 accordingly. Specifically, the disc controller 140 controls the pick-up unit 120 to read one or more disc control blocks at specific locations on the storage disc 101. When the disc control block is recorded by a disc drive during a previous recording on the storage disc 101, the disc control block includes signature that is specific to the storage disc 101. Based on the signature, the disc controller 140 determines the medium type of the storage disc 101 and prepares and sets up the disc drive 110 to operate on the storage disc 101 according to the determined medium type. It is noted that it take relatively short time for the disc drive 110 to determine the medium type based on the stored data on the recording track 190 with comparison to decoding the ADIP. In an example, it takes the disc drive 110 about 100 to 200 ms to read the DCB and determine the medium type. In comparison, it may take the disc drive 110 about one second to determine the medium type by decoding the ADIP. Thus, using the signature in the DCB can reduce disc mounting time, and the disc drive 110 can start recording operation relatively fast.

It is noted that the drive controller 140 can be implemented by various techniques. In an embodiment, the drive controller 140 is implemented as logic circuits. In another embodiment, the drive controller 140 is implemented as a processor executing software instructions.

Figure 3:
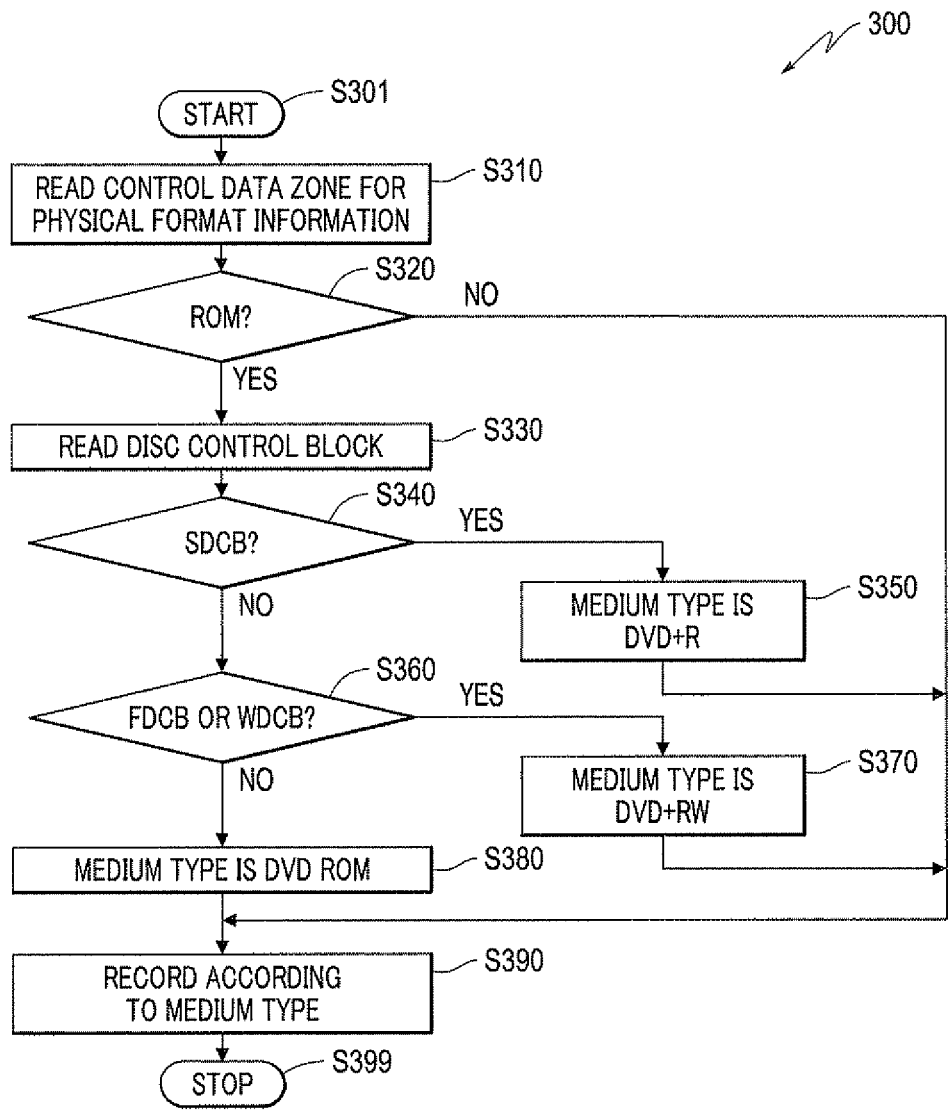
FIG. 3 shows a flow chart outlining a process example 300 according to an embodiment of the disclosure.

FIG. 3 shows a flow chart outlining a process example 300 performed by the drive controller 140 according to an embodiment of the disclosure. In an example, when the storage disc 101 is inserted in the disc drive 110. The disc drive 110 spins up the storage disc 101, and starts a mounting process to recognize the medium type of the storage disc 101, and to prepare and setup for operation on the storage disc 101. During the mounting process, the drive controller 140 performs the process 300. The process starts at S301, and proceeds to S310.

At S310, the drive controller 140 controls the pick-up unit 120 to read a control data zone for physical format information.

At S320, the drive controller 140 determines whether the medium type from the control data zone is ROM. When the medium type is ROM, the process proceeds to S330; otherwise, the process proceeds to S390.

At S330, the drive controller 140 controls the pick-up unit 120 to read a disc control block.

At S340, the drive controller 140 determines whether the content descriptor of the disc control block is indicative of SDCB. For example, the drive controller 140 compares the content descriptor with "53444300" in hexadecimal. When the content descriptor matches "53444300" in hexadecimal, the content descriptor is indicative of SDCB, and the process proceeds to S350; otherwise, the process proceeds to S360.

At S350, the drive controller 140 determines the medium type to be DVD+R.

At S360, the drive controller 140 determines whether the content descriptor of the DCB is indicative of FDCB or WDCB. For example, the drive controller 140 compares the content descriptor with "46444300" and "57444300" in hexadecimal. If the content descriptor is indicative of FDCB or WDCB, the process proceeds to S370; otherwise, the process proceeds to S380.

At S370, the drive controller 140 determines the medium type to be DVD+RW.

At S380, the drive controller 140 determines the medium type to be DVD-ROM.

At S390, the drive controller 140 controls the read and write unit 125 to prepare and setup according to the determined medium type in order to record data onto the storage disc 101. In an example, when the medium type is DVD-ROM, the drive controller 140 generates an error message to inform a user; and when the medium type is DVD+R or DVD+RW, the read and write unit 125 is suitably configured to record data on the storage disc 101. In another example, when the medium type is DVD-ROM, the process proceeds to other suitable steps (not shown). Then, the process proceeds to S399 and terminates.

It is noted that the process 300 can be suitably modified. In an example, S310 and S320 can be skipped, and in S380, the drive controller 140 determines the medium type based on other factors.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   decoding information on a storage disc during an initial recording operation on the storage disc, the information encoded during disc manufacturing of the storage disc:
   receiving data stored at a location on a storage disc during a mounting process without repeating the previous decoding of the information, the location on the storage disc defining a structure of the storage disc, the structure defined as a result of the previous decoding of the information on the storage disc; and determining a medium type based on a parameter in the structure that is indicative of the medium type.

2. The method of claim 1, wherein receiving the data stored at the location on the storage disc further comprises:
receiving the data stored in a disc control block.

3. The method of claim 2, further comprising:
comparing a content descriptor in the disc control block with a plurality of pre-known content descriptors in association with different medium types; and
determining the medium type of the storage disc based on the comparison.

4. The method of claim 1, wherein the location is a first location, the method further comprising:
receiving data stored at a second location on the storage disc, the second location on the storage disc being used for storing physical format information in address in pre-groove (ADIP); and
receiving the data stored at the first location when the data stored at the second location indicates the medium type is read only memory (ROM).

5. The method of claim 3, wherein determining the medium type of the storage disc based on the comparison further comprises:
determining the medium type to be DVD+R when the content descriptor in the disc control block is indicative of a session disc control block (SDCB).

6. The method of claim 3, wherein determining the medium type of the storage disc based on the comparison further comprises:
determining the medium type to be DVD+RW when the content descriptor in the disc control block is indicative at least one of a formatting disc control block (SDCB) and a write inhibit disc control block (WDCB).

7. The method of claim 2, wherein receiving the disc control block further comprises at least one of:
receiving the disc control block at the location in a lead-in zone on the storage disc; and
receiving the data stored at the location in a lead-out zone on the storage disc.

8. The method of claim 1, further comprising:
causing recording on the storage disc according to the medium type.

9. A disc drive, comprising:
a read and write unit configured to perform read and write operation on a storage disc and to decode information on the storage disc during an initial recording operation on the storage disc, the information encoded during disc manufacturing of the storage disc: and
a drive controller configured to control the read and write unit to read data stored at a location on the storage disc during a mounting process without repeating the previous decoding of the information, the location on the storage disc defining a structure of the storage disc as a result of the previous decoding of the information on the storage disc, and to determine a medium type based on a parameter in the structure that is indicative of the medium type.

10. The disc drive of claim 9, wherein the drive controller is configured to control the read and write unit to read a disc control block of the storage disc.

11. The disc drive of claim 10, wherein the drive controller is configured to compare a content descriptor in the disc control block with a plurality of pre-known content descriptors in association with different medium types, and determine the medium type of the storage disc based on the comparison.

12. The disc drive of claim 9, wherein the location is a first location, and the drive controller is configured to control the read and write unit to read data stored at a second location storing physical format information in address in pre-groove (ADIP), and read the data stored at the first location when the data stored at the second location indicates a read only memory (ROM) medium type.

13. The disc drive of claim 11, wherein the drive controller is configured to determine a DVD+R medium type when the content descriptor in the disc control block is indicative of session disc control block (SDCB).

14. The disc drive of claim 11, wherein the drive controller is configured to determine a DVD+RW medium type when the content descriptor in the disc control block is indicative at least one of formatting disc control block (FDCB) and write inhibit disc control block (WDCB).

15. The disc drive of claim 10, wherein the drive controller is configured to control the read and write unit to read at least one of a disc control block in a lead-in zone on the storage disc and a disc control block in a lead-out zone on the storage disc.

16. The disc drive of claim 9, wherein the drive controller is configured to control the read and write unit to write on the storage disc according to the medium type.

17. A circuit, comprising:
a read and write unit configured to perform read and write operation on a storage disc and to decode information on the storage disc during an initial recording operation on the storage disc, the information encoded during disc manufacturing of the storage disc; and
a drive controller configured to control the read and write unit to read data stored at a location on the storage disc during a mounting process without repeating the previous decoding of the information, the location on the storage disc defining a structure of the storage disc as a result of the previous decoding of the information on the storage disc, and to determine a medium type based on a parameter in the structure that is indicative of the medium type.

18. The circuit of claim 17, wherein the drive controller is configured to control the read and write unit to read a disc control block of the storage disc.

19. The circuit of claim 18, wherein the drive controller is configured to compare a content descriptor in the disc control block with a plurality of pre-known content descriptors in association with different medium types, and determine the medium type of the storage disc based on the comparison.

20. The circuit of claim 17, wherein the location is a first location, and the drive controller is configured to control the read and write unit to read data stored at a second location storing physical format information in address in pre-groove (ADIP), and read the data stored at the first location when the data stored at the second location indicates a read only memory (ROM) medium type.

* * * * *